(12) United States Patent
Kinnaert et al.

(10) Patent No.: US 8,186,002 B2
(45) Date of Patent: May 29, 2012

(54) DEVICE FOR THE PIVOTING CONNECTION OF A WIPER BLADE TO A WIPER ARM OF A WINDSCREEN WIPER

(75) Inventors: Erik Kinnaert, Corsurarem (BE); Hans Beelen, Herk de Stad (BE)

(73) Assignee: Robert Bosch GmbH, Stuttgart (DE)

( * ) Notice: Subject to any disclaimer, the term of this patent is extended or adjusted under 35 U.S.C. 154(b) by 1156 days.

(21) Appl. No.: 11/815,492

(22) PCT Filed: Dec. 12, 2005

(86) PCT No.: PCT/EP2005/056681
§ 371 (c)(1),
(2), (4) Date: Nov. 27, 2007

(87) PCT Pub. No.: WO2006/081893
PCT Pub. Date: Aug. 10, 2006

(65) Prior Publication Data
US 2008/0134455 A1    Jun. 12, 2008

(30) Foreign Application Priority Data

Feb. 3, 2005  (DE) .......................... 10 2005 005 184
Apr. 8, 2005  (DE) .......................... 10 2005 016 485

(51) Int. Cl.
*B60S 1/36* (2006.01)
*B60S 1/40* (2006.01)
*B60S 1/34* (2006.01)

(52) U.S. Cl. ............. 15/250.201; 15/250.32; 15/250.43; 15/250.351

(58) Field of Classification Search ................ 15/250.32, 15/250.351, 250.31, 250.43, 250.44, 250.201
See application file for complete search history.

(56) References Cited

U.S. PATENT DOCUMENTS
6,158,078 A * 12/2000 Kotlarski .................. 15/250.32
(Continued)

FOREIGN PATENT DOCUMENTS
DE        10320930 A1    11/2004
(Continued)

OTHER PUBLICATIONS
International Search Report for WO2006/081893.

*Primary Examiner* — Gary Graham
(74) *Attorney, Agent, or Firm* — Michael Best & Friedrich LLP

(57) ABSTRACT

The invention relates to a device (10) for the pivoting connection of a wiper blade (14) to a wiper arm (12) of a windscreen wiper, comprising a connector element (52, 84, 100) fixed to the wiper arm (12) and a connector element (24) fixed to a support element (20) on the wiper blade (14), which supports a bearing element (32), forming a pivoting bearing with a bearing element (34) on an adapter (38, 80) made from plastic. The adaptor (38, 80) is fixed in the profile of the connector element (52, 84, 100) open in the direction of the connector element (24) by clip elements (40, 78, 82) and retainer elements (62, 64, 86, 90, 104). According to the invention, the connector element (52, 84, 100) is an essentially rectangular hollow body, open on the side facing the connector element (24), with a fixing element (60) molded on a longitudinal side thereof which covers the longitudinal side and is fixed to the end of the wiper arm (12) and at least the front walls (54, 56) and a cover wall (58) of the connector element (52, 84, 100) are essentially sealed.

19 Claims, 3 Drawing Sheets

U.S. PATENT DOCUMENTS

| | | | |
|---|---|---|---|
| 6,499,181 B1 * | 12/2002 | Kotlarski | 15/250.201 |
| 6,530,111 B1 | 3/2003 | Kotlarski | |
| 7,690,074 B2 * | 4/2010 | Ostrowski | 15/250.32 |
| 2004/0211021 A1 * | 10/2004 | Weber et al. | 15/250.32 |

FOREIGN PATENT DOCUMENTS

| | | |
|---|---|---|
| DE | 10347637 A1 | 5/2005 |
| WO | 02/40328 A1 | 5/2002 |

* cited by examiner

DEVICE FOR THE PIVOTING CONNECTION OF A WIPER BLADE TO A WIPER ARM OF A WINDSCREEN WIPER

BACKGROUND OF THE INVENTION

The invention relates to a device for the articulated connection of a wiper blade to a wiper arm of a windshield wiper.

This type of device is known from WO 02/40328 A1. It is comprised of a connecting piece in the form of a sheet metal claw, an adapter made of plastic and a connecting element that is firmly connected to the wiper arm. The connecting piece is fastened to a support element of the wiper blade in the form of two parallel resilient rails by means of claws and/or by welding. It has a U-shaped cross-sectional profile, whereby, starting from a base part adjacent to the support element, lateral walls are bent away from the support element by approx. 90°. Openings are provided in the side walls, into which a bearing pin is inserted in a rotatably secured manner. Pivoted on this with a hub is the adapter, which is guided laterally between the lateral walls of the connecting piece. The adapter has clipping means and retainer means, which are used to clip it in the profile of the connecting element that is open towards the wiper blade. In the mounted position, the connecting element overlaps both the adapter as well as the lateral walls of the connecting piece from the outside. In the case of a relative movement between the wiper arm and the wiper blade during the wiping process, contact can occur between the inner side of the connecting element and the outer side of the connecting piece. Since both these parts are manufactured as a rule of metal, this results in increased friction which can also damage the corrosive protection.

A similar device for the articulated connection of a wiper blade to a wiper arm is the subject of older patent application DE 103 47 637.7. In this case, the connecting piece has a middle longitudinal segment in the form of a sheet metal claw, which points away from the support element of the wiper blade, and into which a transverse swivel axis is inserted in a rotationally secured manner. Pivoted on the swivel axis that projects in a cantilevered manner on both sides of the longitudinal segment is the adapter with bearing openings, which are arranged in lateral spring tongues. The adapter, which is manufactured of plastic, encircles the sheet metal claw from the outside and is clipped into the connecting element that is open towards the wiper blade by means of clip elements and retainer elements and the connecting element is firmly connected to the wiper arm. The adapter is guided for one laterally onto the sheet metal claw by inner guide segments and secondly inserted on its lateral walls into the connecting element so it is free of play. As a result, the adapter made of plastic isolates the connecting element from the connecting piece thereby guaranteeing good corrosion resistance and low frictional losses.

SUMMARY OF THE INVENTION

According to the invention, the connecting element is an essentially rectangular hollow body, open on the side facing the connecting piece with a fixing element molded on a longitudinal side thereof. This covers the longitudinal side of the rectangular hollow body and is fixed to the end of the wiper arm. In addition, at least the front walls and a cover wall of the rectangular hollow body are essentially sealed. The adapter in inserted into the rectangular hollow body, which adapter has a matching rectangular outer contour and surrounds the connecting piece from the outside so that the adapter is guided practically free of play in the connecting element and transmits the forces exerted by the wiper arm effectively to the wiper blade.

In preferred embodiment, the longitudinal side that lies opposite from the fixing element is open. In this case, at least one retainer element is expediently arranged, preferably, however, two in the form of two lateral brackets, which are attached on the front walls of the connecting element, whereby the lateral brackets lie in the plane of the open longitudinal side so that clip elements on an associated longitudinal side of the adapter can engage in the lateral brackets. On the opposing longitudinal side, the adapter is adjacent to a retainer bracket, whose bent end simultaneously secures said adapter in the direction of the wiper blade. In this case, the retainer bracket can encircle the lower edge of the adapter or engage in a recess of the adapter.

The open longitudinal side of the connecting element is thus sealed by the associated longitudinal wall of the adapter. The open longitudinal side of the connecting element makes it possible to easily actuate the clip elements of the adapter during disassembly. In addition, the device in accordance with the invention makes possible a connection of the wiper arm to the wiper blade that is favorable in terms of the airflow, in particular in the area of the upper cover wall and the front wall of the connecting element that faces away from the wiper arm. These areas are particularly critical during the downward movement of the windshield wiper, when, because of the inflowing air, there is a risk that residual water will be drawn back onto the already cleaned vehicle window. This can be counteracted because of the free scope of design in the case of the inventive device. As a result, blind angles where residual water can accumulate when it rains are expediently avoided. Furthermore, it is expedient if a spoiler element is provided, which, for one, supports the spoiler effect of a wiper blade spoiler, and, secondly, directs the airflow in this region away from the vehicle window so that water being carried along by the airflow cannot make impact with the vehicle window.

The spoiler element can be an integral part of the upper cover wall of the connecting element, but it can also be molded onto a protective cap, which for optical reasons covers for example the open longitudinal side of the connecting element and therefore the clip elements on the adapter. As a result, it can simultaneously perform design functions. The protective cap can be fastened either to the connecting element or to the adapter, e.g., by being clipped on the lateral brackets of the connecting element or being held by stop pins in the snap-in holes of the adapter. Furthermore, it can be pivotably connected to the lateral brackets of the connecting element or to the adapter via an articulation. In this case, the protective cap engages in a closed state in clip elements on the connecting element.

In addition to the designer function, the protective cap can perform hydrodynamic functions and safety tasks. In the first case, it overlaps at least partially the cover wall of the connecting element, whereby the overlapping part of the protective cap is embodied as a spoiler element or supports a separate spoiler element. As a result, the spoiler function of the wiper blade spoiler is supported and the air stream is deflected from the vehicle window in the area of the inventive device. This prevents (or at least reduces) water from being drawn back onto the already cleaned vehicle window during the downward movement of the windshield wiper. If the lateral wall of the protective cap is fastened to the adapter, which it simultaneously uses as a securing bow, which holds the adapter and the connecting element together.

At least one clip element, preferably two clip elements, is/are provided on the longitudinal side of the adapter. These are covered towards the outside by the protective cap. A button is provided on the protective cap so that said clip elements can nevertheless be actuated for disassembly purposes when the protective cap is closed; this button acts on the clip elements and disengages them during actuation.

The button can also be arranged on a front side of the adapter and engage in a button opening on the front wall of the connecting element. In this case, it simultaneously assumes the function of a clip element. Attached to the opposing front wall of the connecting element is a retainer element, which grips behind the adapter with its bent end and secures it in the direction of the wiper blade.

The connecting piece, on which the adapter is pivoted, expediently features on each of its longitudinal sides a lateral cheek starting from a base piece, which points towards the adapter. The lateral cheeks are connected to one another by a bearing bush in which a bearing pin is rotatably mounted. This arrangement results in a wide support base and therefore good lateral guidance for the wiper blade. The bearing pin is expediently connected on its ends to the adapter in a rotationally secured manner, e.g., by a press fit or in an advantageous manner by a form closure by form closure elements being provided on its ends. This can be e.g., a serration or a polygonal cross-sectional profile.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The person skilled in the art will also observe individual features expediently and combine them into additional, meaningful combinations.

The drawings show.

DETAILED DESCRIPTION

Figure 1:
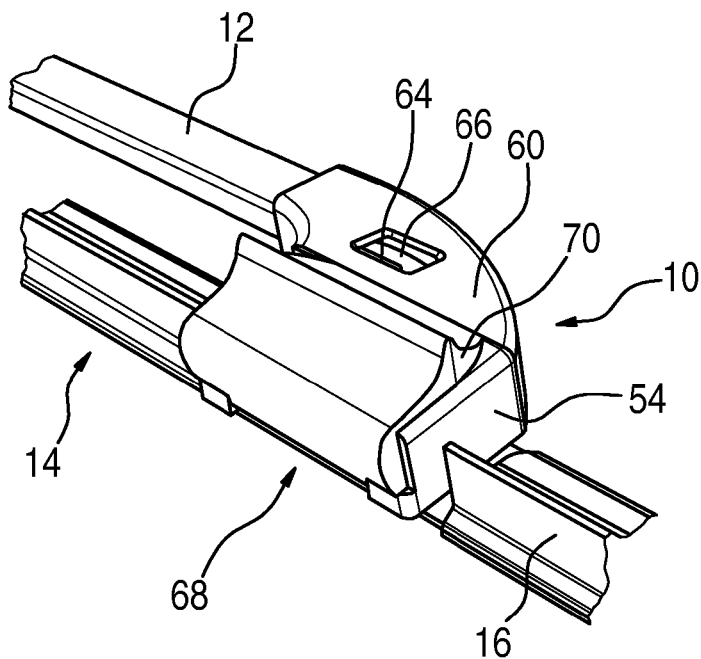
FIG. 1 A perspective representation of a mounted device in accordance with the invention, FIG. 2 An exploded representation of the device in accordance with the invention, FIG. 3 A perspective representation of a protective cap according to FIG. 2 from another direction, FIG. 4 A variation of FIG. 1, FIG. 5 An exploded representation of a variation of FIG. 4, FIG. 6 A variation of FIG. 1 with a hinged protective cap.

A wiper blade 14 is connected in a pivoted manner to a wiper arm 12 via a device 10. The wiper blade 14 includes a wiper strip 18 and a support element 20 in the form of two parallel resilient rails on which a spoiler 16 is fastened. A connecting piece 24 is firmly connected to the support element 20 in a window 22 of the spoiler 16. This can be accomplished by welding and/or claws 28.

The connecting piece 24 has a base plate on which the claws 28 are molded, and from which lateral cheeks 30 emanate, which are bent away from the support element 20 towards the base plate 26 by approx. 90°. The lateral cheeks 30 carry a bearing bush 32 in which a bearing pin 34 is pivoted. The ends of the bearing pin 34 project laterally from the bearing bush 32 and have form closure elements 36, with which the bearing pin 34 is inserted in a rotational secured manner in openings 46 of the adapter 38.

The adapter 38 has a rectangular outer contour. Two clip elements 40 in the form of spring tongues that have clip noses 42 are provided on one longitudinal side. It is inserted from the side of the wiper blade 14 into a connecting element 52, which is an essentially rectangular hollow body and is precisely adjacent with its inner contour to the outer contour of the adapter 38. The connecting element 52 is closed on its cover wall 58 and its front walls 54 and 56. A fixing element 60 is molded on one longitudinal side of the connecting element 52, and said fixing element covers the longitudinal side and is firmly connected on one end to the wiper arm 12. A retainer bracket 64 is provided on this longitudinal side on the cover wall 58, and said retainer bracket is embodied to be flexible to the outside and secures the adapter 38 in the direction of the wiper blade 14. To do so, the retainer bracket 64 engages in a corresponding recess of the adapter 38 or grips around the lower edge of the adapter 38. The longitudinal side, which is opposite from the fixing element 60 can be closed. It is open in the depicted exemplary embodiment. On this longitudinal side the connecting element 58 has two lateral brackets 62, which emanate from the front walls 54, 56, and on which the clip noses 42 of the clips elements 40 engage during assembly and abut with their stopping faces 44. During disassembly, the clip noses 42 can be pressed back inwardly and the adapter 38 can be removed from the connecting element 52. If necessary, the retainer bracket 64 can be pressed back outwardly through an opening 66 in the fixing element 60.

The fixing element 60 terminates flush with the cover wall 58 so that no water can collect on the transition. Furthermore, the fixing element 60 is rounded towards the forward front wall 54 thereby providing the inflowing air with a flow component in the direction of the spoiler 16 so that a situation where water is drawn back onto the cleaned vehicle window is avoided.

In addition, a spoiler element 70 can be provided on the cover wall 58 of the connecting element 52, and said spoiler element can be firmly connected to the cover wall 58 as a separate component or as an integral component of the connecting element 52. Because of the spoiler element 70, the spoiler effect of the spoiler 16 is supported on the one hand, and the airflow is deflected from the vehicle window on the other, so that the drawing back of water onto the vehicle window is reduced.

Figure 2:
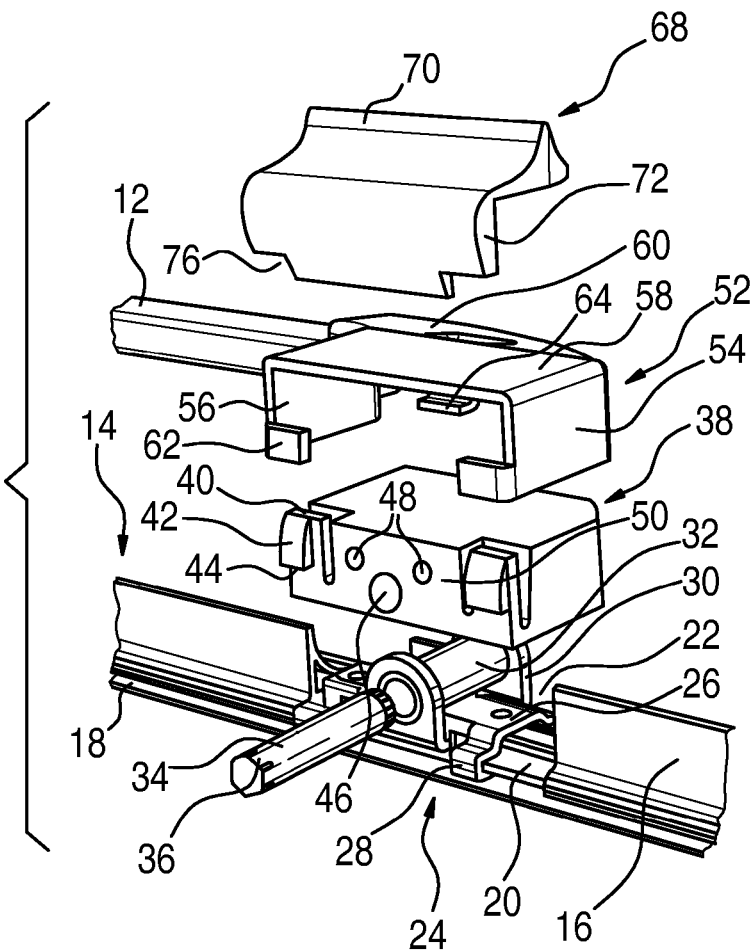
Figure 3:
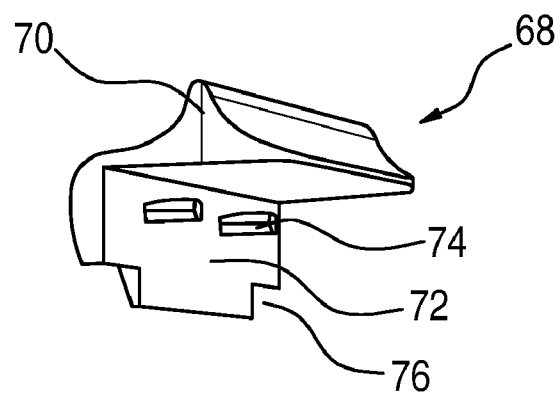

The spoiler element 70 can also be part of a protective cap 68, which is connected to the adapter 38 or the connecting element 52. In this case, in the embodiment in FIG. 1 through FIG. 3 two stop pins 74 are arranged on a lateral wall 72 of the protective cap 68 and said stop pins are inserted into two snap-in holes 48 of the adapter 38. This takes place after the adapter 38 has been inserted into the connecting element 52 so that the lateral walls 72 of the protective cap 68 cover the clip elements 40 of the adapter 38 and the spoiler element 70 at least partially covers the cover wall 58 of the connecting element 52. As a result, in addition to its designer function and airflow function, the protective cap 68 also assumes a securing function of the adapter 38 with respect to the connecting element 52. The stop pins 74 can be slid into the snap-in holes 48 through the open longitudinal side of the connecting element 52. In the case of a closed longitudinal side, corresponding openings for the stop pins 74 are provided in the lateral wall of the connecting element 52. The protective cap 68 has corresponding recesses 76 in the area of the lateral brackets 62 of the connecting element 52. In order to connect the protective cap 68 to the connecting element 52, it is advantageous to clip it on the lateral bracket 62.

To actuate the clip elements 40 on a lateral wall 50 of the adapter 38, the protective cap 68 can have a button 78, which can be operated from the outside and acts on the clip element

Figure 4:
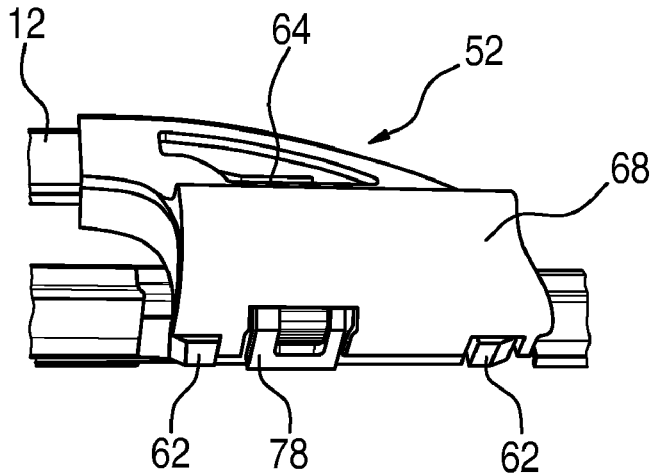

40 (FIG. 4). When the protective cap 68 is connected to the connecting element 52, the button 78 can be arranged on the adapter 38 and assume the functions of clip elements by engaging in a corresponding opening on the associated lateral wall of the connecting element 52 and/or the protective cap 68.

Figure 5:
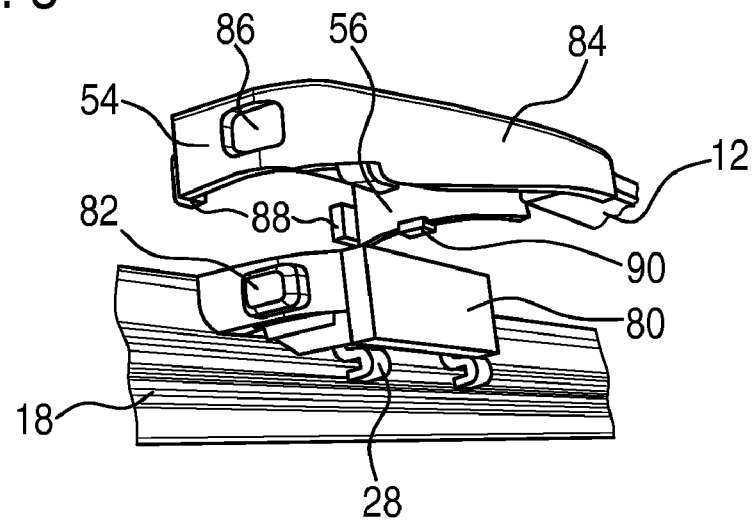

The clip elements 40 on the longitudinal side of the adapter 38 can be replaced or supplemented by a button 82 on a front side of the adapter 38 (FIG. 5). This engages in a corresponding button opening 86 in the associated front wall 54 of a connecting element 84, while a retainer bracket 90 is provided on the opposing front wall 56, which grips under the adapter 80 or engages in a corresponding recess of the adapter 80. The connecting element 84 then has lateral brackets 88 towards the open longitudinal side, which guide the adapter 80 on this longitudinal side.

Figure 6:
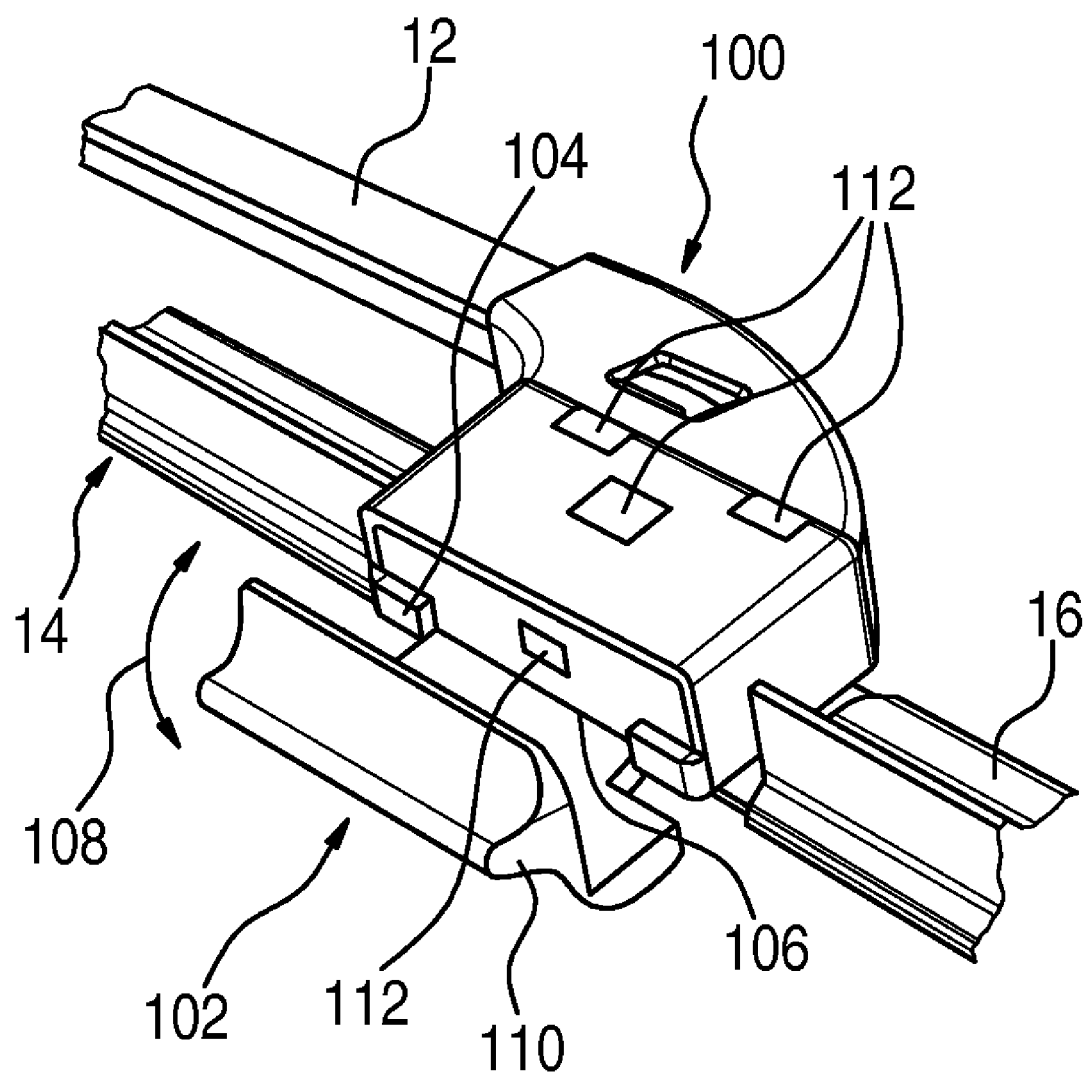

FIG. 6 depicts an embodiment in which a protective cap 102 with a spoiler element 110 is pivoted on the adapter 38, 80 or on the connecting element 100, i.e., at the lateral brackets 104, around an articulation 106 in the direction of an arrow 108. The connecting element 100 has clipping means 112 on its cover wall or on its longitudinal wall, with which the protective cap 102 engages in a closed state.

The invention claimed is:

1. Device (10) for pivoting connection of a wiper blade (14) to a wiper arm (12) of a windshield wiper, comprising a connecting element (52, 84, 100) fixed to the wiper arm (12) and a connecting piece (24) fixed to a support element (20) on the wiper blade (14), which supports a bearing element (32), forming a pivoting bearing with a bearing element (34) on an adapter (38, 80) made of plastic, whereby the adapter (38, 80) is fixed in the profile of the connecting element (52, 84, 100), that is open in a direction of the connecting piece (24), by clip elements (40, 78, 82) and retainer elements (62, 64, 86, 90, 104), characterized in that the connecting element (52, 84, 100) is an essentially rectangular hollow body, open on the side facing the connecting piece (24) with a fixing element (60) molded on a longitudinal side thereof, which covers the longitudinal side and is fixed to the end of the wiper arm (12) and substantially open on an opposite longitudinal side except for a presence of the retainer elements, and that at least front walls (54, 56) and a cover wall (58) of the connecting element (52, 84, 100) are essentially sealed.

2. Device (10) according to claim 1, characterized in that the adapter (38, 80) has a rectangular outer contour and surrounds the connecting piece (24) from the outside, whereby the adapter (38, 80) is inserted in the connecting element (52, 84, 100) from a side of the wiper blade (14) and on a longitudinal side has at least one clip element (40) with a clip nose (42), which engages on a retainer element (62) on the open longitudinal side of the connecting element (52, 84, 100), while on the covered longitudinal side a retainer bracket (64) secures the adapter (38, 80) in a direction of the wiper blade (14).

3. Device (10) according to claim 2, characterized in that two clip elements (40) cooperate with two retainer elements in the form of two lateral brackets (62), which are arranged on the front walls (54, 56) of the connecting element (52).

4. Device (10) according to claim 3, characterized in that a lateral bracket (62) projects from each front wall (54, 56) along the open longitudinal side.

5. Device (10) according to claim 4, characterized in that the adapter (38) has an upper surface facing toward the cover wall (58), the clip element (40) has a free end projecting toward the upper surface, a groove extending from the upper surface and behind the clip element (40).

6. Device (10) according to claim 1, characterized in that a spoiler element (70, 110) extending in a longitudinal direction of the wiper blade (14) is provided on the cover wall (58) of the connecting element (52, 84 100).

7. Device (10) according to claim 1, characterized in that the adapter (80) has a button (82) on one front side, which engages in a button opening (86) in a front wall (54, 56) of the connecting element (84), while the adapter (40) is held on the opposing front side (54, 56) by a retainer bracket (90) of the connecting element (84).

8. Device (10) for pivoting connection of a wiper blade (14) to a wiper arm (12) of a windshield wiper, comprising a connecting element (52, 84, 100) fixed to the wiper arm (12) and a connecting piece (24) fixed to a support element (20) on the wiper blade (14), which supports a bearing element (32), forming a pivoting bearing with a bearing element (34) on an adapter (38, 80) made of plastic, whereby the adapter (38, 80) is fixed in the profile of the connecting element (52, 84, 100) that is open in a direction of the connecting piece (24) by clip elements (40, 78, 82) and retainer elements (62, 64, 86, 90, 104), characterized in that the connecting element (52, 84, 100) is an essentially rectangular hollow body, open on the side facing the connecting piece (24) with a fixing element (60) molded on a longitudinal side thereof, which covers the longitudinal side and is fixed to the end of the wiper arm (12), that at least front walls (54, 56) and a cover wall (58) of the connecting element (52, 84, 100) are essentially sealed, and that the connecting piece (24) has a lateral cheek (30) on each of its longitudinal sides starting from a base piece (26), and said cheeks are pointed towards the adapter (38, 80) and are connected to one another by a bearing bush (32) in which a bearing pin (34) is rotatably mounted.

9. Device (10) according to claim 8, characterized in that the bearing pin (34) is connected on its ends in a rotationally secured manner to lateral walls (50) of the adapter (38, 80).

10. Device (10) according to claim 9, characterized in that the bearing pin (34) has form closure elements (36) on its ends, which engage and/or are pressed in openings (46) on the lateral walls (50) of the adapter (38).

11. Device (10) for pivoting connection of a wiper blade (14) to a wiper arm (12) of a windshield wiper, comprising a connecting element (52, 84, 100) fixed to the wiper arm (12) and a connecting piece (24) fixed to a support element (20) on the wiper blade (14), which supports a bearing element (32), forming a pivoting bearing with a bearing element (34) on an adapter (38, 80) made of plastic, whereby the adapter (38, 80) is fixed in the profile of the connecting element (52, 84, 100) that is open in a direction of the connecting piece (24) by clip elements (40, 78, 82) and retainer elements (62, 64, 86, 90, 104), characterized in that the connecting element (52, 84, 100) is an essentially rectangular hollow body, open on the side facing the connecting piece (24) with a fixing element (60) molded on a longitudinal side thereof, which covers the longitudinal side and is fixed to the end of the wiper arm (12), that at least front walls (54, 56) and a cover wall (58) of the connecting element (52, 84, 100) are essentially sealed, and that the device (10) has a protective cap (68, 102), which is connected to the adapter (38, 80) or to the connecting element (52, 84, 100) via a lateral wall (72), covers an associated longitudinal side of the connecting element (52, 84, 100) and extends at least partially over the cover wall (58) of the connecting element (52, 84, 100).

12. Device (10) according to claim 11, characterized in that the protective cap (68) has inwardly pointing stop pins (74) on its lateral wall (72) that engage in snap-in holes (48) of the adapter (38).

13. Device (10) according to claim 11, characterized in that the retainer elements include lateral brackets (62), and in that the protective cap (68) is clipped on the lateral brackets (62) of the connecting element (52).

14. Device (10) according to claim 11, characterized in that the retainer elements include lateral brackets (62), and in that the protective cap (102) is pivotably connected to the lateral brackets (104) of the connecting element (100) via an articulation (106) and engages with the connecting element (100) via clipping means (112) on the cover wall (58).

15. Device (10) according to claim 11, characterized in that the lateral wall (72) of the protective cap (68) is connected to the adapter via an articulation (106) on one longitudinal side of the adapter (38, 80) and engages with the connecting element (100) via clipping means (112) on the cover wall (58).

16. Device (10) according to claim 11, characterized in that a spoiler element (70, 110) is molded on the protective cap (68, 102).

17. Wiper blade (14) with a connecting piece (24) for use in a device (10) for pivoting connection of the wiper blade (14) to a wiper arm (12) of a windshield wiper, with a connecting element (52, 84, 100) fixed to the wiper arm (12), the connecting piece (24) fixed to a support element (20) on the wiper blade (14), which supports a bearing element (32), forming a pivoting bearing with a bearing element (34) on an adapter (38, 80) made of plastic, whereby the adapter (38, 80) is fixed in the profile of the connecting element (52, 84, 100) that is open in a direction of the connecting piece (24) by clip elements (40, 78, 82) and retainer elements (62, 64, 86, 90, 104), characterized in that the connecting element (52, 84, 100) is an essentially rectangular hollow body, open on the side facing the connecting piece (24) with a fixing element (60) molded on a longitudinal side thereof, which covers the longitudinal side and is fixed to the end of the wiper arm (12) and substantially open on an opposite longitudinal side except for a presence of the retainer elements, and that at least front walls (54, 56) and a cover wall (58) of the connecting element (52, 84, 100) are essentially sealed.

18. Wiper arm (12) with a connecting element (52, 84, 100) for use in a device (10) for pivoting connection of a wiper blade (14) to the wiper arm (12) of a windshield wiper, the connecting element (52, 84, 100) fixed to the wiper arm (12) and a connecting piece (24) fixed to a support element (20) on the wiper blade (14), which supports a bearing element (32), forming a pivoting bearing with a bearing element (34) on an adapter (38, 80) made of plastic, whereby the adapter (38, 80) is fixed in the profile of the connecting element (52, 84, 100) that is open in a direction of the connecting piece (24) by clip elements (40, 78, 82) and retainer elements (62, 64, 86, 90, 104), characterized in that the connecting element (52, 84, 100) is an essentially rectangular hollow body, open on the side facing the connecting piece (24) with a fixing element (60) molded on a longitudinal side thereof, which covers the longitudinal side and is fixed to the end of the wiper arm (12) and substantially open on an opposite longitudinal side except for a presence of the retainer elements, and that at least front walls (54, 56) and a cover wall (58) of the connecting element (52, 84, 100) are essentially sealed.

19. Adapter (38, 80) with clipping means (40, 78, 82) and openings (46) in its longitudinal walls for use in a device (10) for pivoting connection of a wiper blade (14) to a wiper arm (12) of a windshield wiper, comprising a connecting element (52, 84, 100) fixed to the wiper arm (12) and a connecting piece (24) fixed to a support element (20) on the wiper blade (14), which supports a bearing element (32), forming a pivoting bearing with a bearing element (34) on the adapter (38, 80), the adapter made of plastic, whereby the adapter (38, 80) is fixed in the profile of the connecting element (52, 84, 100) that is open in a direction of the connecting piece (24) by clip elements (40, 78, 82) and retainer elements (62, 64, 86, 90, 104), characterized in that the connecting element (52, 84, 100) is an essentially rectangular hollow body, open on the side facing the connecting piece (24) with a fixing element (60) molded on a longitudinal side thereof, which covers the longitudinal side and is fixed to the end of the wiper arm (12) and substantially open on an opposite longitudinal side except for a presence of the retainer elements, and that at least front walls (54, 56) and a cover wall (58) of the connecting element (52, 84, 100) are essentially sealed.

* * * * *